United States Patent
Peng et al.

(10) Patent No.: US 9,837,815 B2
(45) Date of Patent: Dec. 5, 2017

(54) SYMMETRIC METHOD FOR OBTAINING LINE-TRANSFERRED LINEAR ACTIVE POWER FLOWS IN MTDC POWER NETWORKS

(71) Applicant: SHENZHEN UNIVERSITY, Shenzhen (CN)

(72) Inventors: Jianchun Peng, Shenzhen (CN); Hui Jiang, Shenzhen (CN)

(73) Assignee: SHENZHEN UNIVERSITY, Shenzhen, Guangdong (CN)

( * ) Notice: Subject to any disclaimer, the term of this patent is extended or adjusted under 35 U.S.C. 154(b) by 178 days.

(21) Appl. No.: 14/904,922

(22) PCT Filed: May 19, 2015

(86) PCT No.: PCT/CN2015/079300
§ 371 (c)(1),
(2) Date: Jan. 13, 2016

(87) PCT Pub. No.: WO2016/183805
PCT Pub. Date: Nov. 24, 2016

(65) Prior Publication Data
US 2016/0372922 A1  Dec. 22, 2016

(51) Int. Cl.
*H02J 1/10* (2006.01)
*H02J 1/00* (2006.01)
(Continued)

(52) U.S. Cl.
CPC ........ *H02J 1/00* (2013.01); *H02J 3/00* (2013.01); *H02J 13/0003* (2013.01); *Y02B 90/228* (2013.01); *Y04S 20/18* (2013.01)

(58) Field of Classification Search
CPC . H02J 1/00; H02J 13/0003; H02J 3/00; Y04S 20/18; Y02B 90/228
See application file for complete search history.

(56) References Cited

U.S. PATENT DOCUMENTS

| 2015/0131342 A1 | 5/2015 | Larsson et al. |
| 2016/0301209 A1* | 10/2016 | Peng ................... H02J 3/12 |

FOREIGN PATENT DOCUMENTS

| CN | 1039556733 | 7/2014 |
| CN | 104167756 | 11/2014 |

(Continued)

OTHER PUBLICATIONS

Lu et al., "An improved multi-terminal HVDC power flow method," Proceedings of the EPSA, 2000, vol. 12, No. 5, 4 pages total, English language abstract provided.

(Continued)

*Primary Examiner* — Kenneth B Wells
(74) *Attorney, Agent, or Firm* — Hamre, Schumann, Mueller & Larson, P.C.

(57) ABSTRACT

The present invention belongs to electric power engineering field, and provides a symmetric method for obtaining line-transferred linear active power flows in Multi-Terminal Direct Current (MTDC) power networks, which comprises: firstly establishing a system of symmetric linear indeterminate equations of buses' injection active powers in terms of buses' voltage offsets; then establishing a symmetric linear matrix equation of buses' voltage offsets in terms of buses' injection active powers and obtaining each bus' voltage offset and bus' voltage of the MTDC power network according to the system of symmetric linear indeterminate equations; finally establishing a symmetric linear relationship that expresses a line-transferred linear active power flow in terms of buses' injection active powers and obtaining each line-transferred linear active power flow of the MTDC power network according to the symmetric linear matrix equation of buses' voltage offsets in terms of buses' injection active powers, known line-transferred non-linear active power flow and inherent operation features of the MTDC power network. The method of the present invention reliably (Continued)

produces accurate results, and not only fast enough for real-time operation regulation of arbitrarily completed MTDC power networks but also applicable for widely varying operation states of them.

4 Claims, 2 Drawing Sheets

(51) Int. Cl.
*H02J 3/00* (2006.01)
*H02J 13/00* (2006.01)

(56) References Cited

FOREIGN PATENT DOCUMENTS

| CN | 104319772 | 1/2015 |
|----|-----------|--------|
| CN | 104362619 | 2/2015 |

OTHER PUBLICATIONS

Sun et al., "A nodal impedance matrix based Gauss-Seidel method on steady state power flow calculation of DC power grid," Proceedings of the CSEE, 2015, vol. 35, No. 8, pp. 1882-1892, English language abstract provided.

International Search Report of PCT/CN2015/079300, dated Sep. 2, 2015, 11 pages total.

* cited by examiner

SYMMETRIC METHOD FOR OBTAINING LINE-TRANSFERRED LINEAR ACTIVE POWER FLOWS IN MTDC POWER NETWORKS

TECHNICAL FIELD

The present invention belongs to electric power engineering field, and in particular, relates to a symmetric method for obtaining line-transferred linear active power flows in Multi-Terminal Direct Current (MTDC) power networks.

BACKGROUND

At present, the large-scale development of offshore wind farms and technical and economic advantages of DC power transmission are greatly encouraging the use of MTDC power networks. As a foundation of operation regulation of MTDC power networks, the method for obtaining line-transferred active power flows, especially the accurate and fast and reliable method for obtaining line-transferred linear active power flows is urgently needed to be developed.

The existing methods for obtaining line-transferred active power flows in a MTDC power network are iterative ones based on a system of non-linear equations of buses' injection active powers in terms of buses' voltages. Since the non-linearity of the system of non-linear equations, the existing methods are not only time-consumed in each iteration but also unreliable in convergence. As a result, they are not fast enough and not applicable for real-time operation regulation of simple MTDC power networks (those are the power networks of 3 buses), and especially not applicable for real-time operation regulation of complex MTDC power networks (those are the power networks have more than 3 buses). If the incremental linear models produced by linearizing the existing ones at their basic operation points are adopted, they are indeed applicable for the adjacent areas of their basic operation points but not applicable for widely varying operation states of the MTDC power network. Therefore, the above existing methods for obtaining line-transferred active power flows in MTDC power networks are not only time-consumed and unreliable, but also not fast enough for real-time operation regulation of arbitrarily completed MTDC power networks and not applicable for widely varying operation states of them.

SUMMARY

The present invention aims at providing a symmetric method for obtaining line-transferred linear active power flows in MTDC power networks, to solve the problem that the existing methods for obtaining line-transferred active power flows in a MTDC power network are not only time-consumed and unreliable, but also not fast enough for real-time operation regulation of arbitrarily completed MTDC power networks and not applicable for widely varying operation states of them.

The present invention is implemented by a symmetric method for obtaining line-transferred linear active power flows in MTDC power networks, which comprises the following steps of:

establishing a system of symmetric linear indeterminate equations of buses' injection active powers in terms of buses' voltage offsets (a bus' voltage offset is the difference between the bus' voltage and 1.0 per-unit voltage) according to given lines' parameters, inherent operation features and given buses' injection active powers of the MTDC power network;

establishing a symmetric linear matrix equation of buses' voltage offsets in terms of buses' injection active powers and obtaining each bus' voltage offset and bus' voltage of the MTDC power network according to the system of symmetric linear indeterminate equations of buses' injection active powers in terms of buses' voltage offsets;

establishing a symmetric linear relationship that expresses a line-transferred linear active power flow in teems of buses' injection active powers and obtaining each line-transferred linear active power flow of the MTDC power network according to the symmetric linear matrix equation of buses' voltage offsets in terms of buses' injection active powers, known line-transferred non-linear active power flow and inherent operation features of the MTDC power network.

In the present invention, the method comprises the steps of: firstly establishing a system of symmetric linear indeterminate equations of buses' injection active powers in terms of buses' voltage offsets; then establishing a symmetric linear matrix equation of buses' voltage offsets in terms of buses' injection active powers and obtaining each bus' voltage offset and bus' voltage of the MTDC power network according to the system of symmetric linear indeterminate equations; finally establishing a symmetric linear relationship that expresses a line-transferred linear active power flow in terms of buses' injection active powers and obtaining each line-transferred linear active power flow of the MTDC power network according to the symmetric linear matrix equation of buses' voltage offsets in terms of buses' injection active powers, known line-transferred non-linear active power flow and inherent operation features of the MTDC power network. The method of the present invention reliably produces accurate results, and not only fast enough for real-time operation regulation of arbitrarily completed MTDC power networks but also applicable for widely varying operation states of them, thereby solving the problem that the existing methods for obtaining line-transferred active power flows in MTDC power networks are not only time-consumed and unreliable, but also not fast enough for real-time operation regulation of arbitrarily completed MTDC power networks and not applicable for widely varying operation states of them.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiment described herein is merely used to explain the present invention but is not used to limit the present invention to it.

An embodiment of the present invention provides a symmetric method for obtaining line-transferred linear active power flows in MTDC power networks, which comprises the following steps of:

establishing a system of symmetric linear indeterminate equations of buses' injection active powers in terms of buses' voltage offsets (a bus' voltage offset is the difference between the bus' voltage and 1.0 per-unit voltage) according to given lines' parameters, inherent operation features and given buses' injection active powers of the MTDC power network;

establishing a symmetric linear matrix equation of buses' voltage offsets in terms of buses' injection active powers and obtaining each bus' voltage offset and bus' voltage of the MTDC power network according to the system of symmetric linear indeterminate equations of buses' injection active powers in terms of buses' voltage offsets;

establishing a symmetric linear relationship that expresses a line-transferred linear active power flow in terms of buses' injection active powers and obtaining each line-transferred linear active power flow of the MTDC power network according to the symmetric linear matrix equation of buses' voltage offsets in terms of buses' injection active powers, known line-transferred non-linear active power flow and inherent operation features of the MTDC power network.

In the embodiment of the present invention, the method comprises: firstly establishing a system of symmetric linear indeterminate equations of buses' injection active powers in terms of buses' voltage offsets; then establishing a symmetric linear matrix equation of buses' voltage offsets in terms of buses' injection active powers and obtaining each bus' voltage offset and bus' voltage of the MTDC power network according to the system of symmetric linear indeterminate equations; finally establishing a symmetric linear relationship that expresses a line-transferred linear active power flow in terms of buses' injection active powers and obtaining each line-transferred linear active power flow of the MTDC power network according to the symmetric linear matrix equation of buses' voltage offsets in terms of buses' injection active powers, known line-transferred non-linear active power flow and inherent operation features of the MTDC power network. The method of the present invention reliably produces accurate results, and not only fast enough for real-time operation regulation of arbitrarily completed MTDC power networks but also applicable for widely varying operation states of them.

Figure 1:
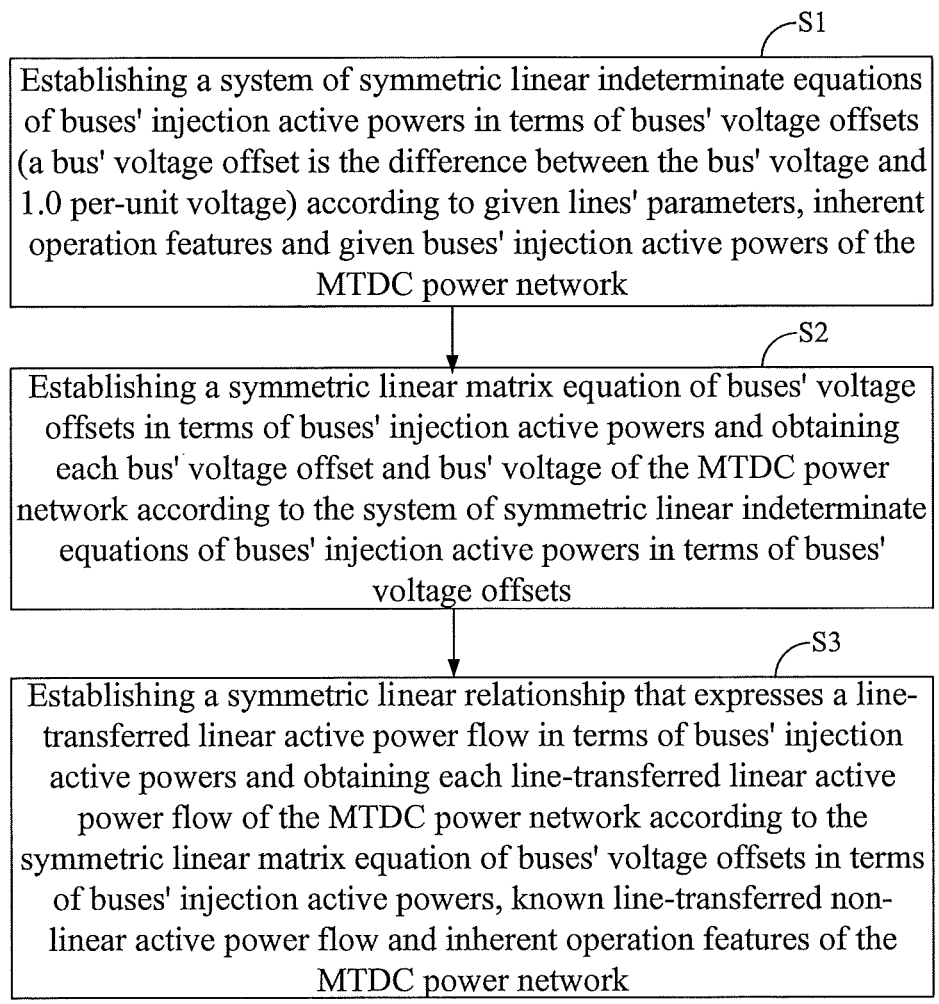
FIG. 1 is a flow chart of the symmetric method for obtaining line-transferred linear active power flows in MTDC power networks according to an embodiment of the present invention.
Figure 2:
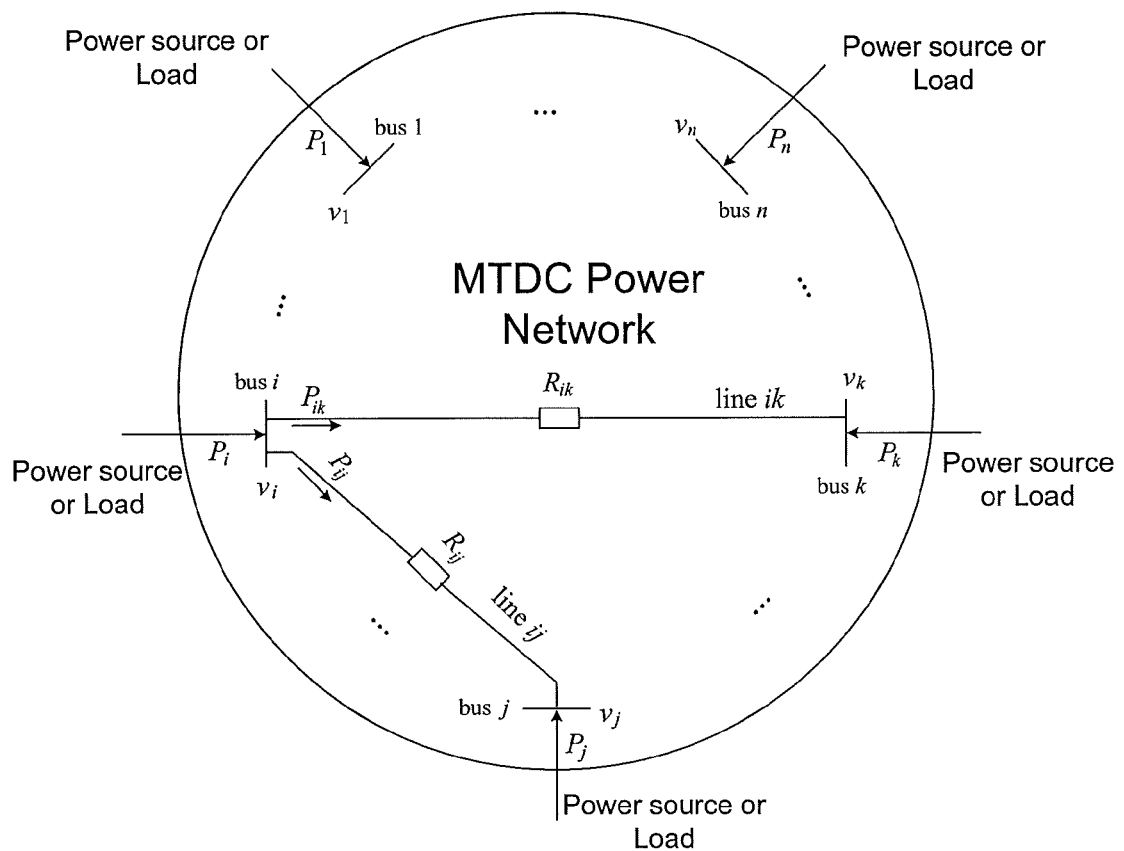
FIG. 2 is a structure diagram of the universal model of MTDC power networks according to an embodiment of the present invention.

FIG. 1 shows the flow chart of the symmetric method for obtaining line-transferred linear active power flows in MTDC power networks according to an embodiment of the present invention. For illustration purposes, only the parts related to the embodiment of the present invention are shown, and described in detail as follows:

In step S1, a system of symmetric linear indeterminate equations of buses' injection active powers in terms of buses' voltage offsets (a bus' voltage offset is the difference between the bus' voltage and 1.0 per-unit voltage) is established according to given lines' parameters, inherent operation features and given buses' injection active powers of the MTDC power network;

The step S1 specifically comprises the following substeps of:

according to given lines' parameters, inherent operation features (i.e. the buses' voltages are all close to 1.0 per-unit and the quadratic terms of buses' voltage offsets are all quite small) and given buses' injection active powers of the MTDC power network, establishing a linear relationship that expresses a bus' injection active power in terms of buses' voltage offsets as follows:

$$P_i = \sum_{k=1, k\neq i}^{n} \frac{(v_i - v_k)}{R_{ik}}$$

as shown in FIG. 2, i is the serial number of an arbitrary bus in the MTDC power network, i is natural number and equal to 1, 2 ···, n, n is the total number of buses excluding neutral point in the MTDC power network, and n is a natural number; k is the serial number of an arbitrary bus in the MTDC power network, k is natural number and equal to 1, 2 ···, n; $P_i$ is the bus' injection active power at bus i (the active power injected by the power source or load on bus i); $v_i$ and $v_k$ are the buses' voltage offsets at bus i and bus k, respectively, and they are the differences between bus' voltage and 1.0 per-unit voltage; ik denotes the line between bus i and bus k and is called line ik for short; $R_{ik}$ is the resistance of line ik; $P_i$, n and $R_{ik}$ are given parameters of the MTDC power network; and according to the linear relationship that expresses a bus' injection active power in terms of buses' voltage offsets, establishing a system of symmetric linear indeterminate equations of buses' injection active powers in terms of buses' voltage offsets as follows:

$$\begin{bmatrix} P_1 \\ \vdots \\ P_i \\ \vdots \\ P_{n-1} \end{bmatrix} = (G_{ij}) \begin{bmatrix} v_1 \\ \vdots \\ v_j \\ \vdots \\ v_n \end{bmatrix}, G_{ij} = \begin{cases} \dfrac{-1}{R_{ij}}, & \text{for } j \neq i \\ \displaystyle\sum_{k=1, k\neq i}^{n} \dfrac{1}{R_{ik}}, & \text{for } j = i \end{cases}$$

as shown in FIG. 2, $P_1$ and $P_{n-1}$ are the buses' injection active powers at bus 1 and bus n-1, respectively, and are given parameters of the MTDC power network; j is the serial number of an arbitrary bus in the MTDC power network, j is natural number and equal to 1, 2 ···, n; ij denotes the line between bus i and bus j; $(G_{ij})$ is (n-1)-by-n bus conductance matrix of the MTDC power network, and is given matrix of the MTDC power network; $G_{ij}$ is the element in row i and column j of the bus conductance matrix $(G_{ij})$; $v_1$, $v_j$ and $v_n$ are buses' voltage offsets at bus 1, bus j and bus n, respectively, and they are the differences between bus' voltage and 1.0 per-unit voltage; $R_{ij}$ is the resistance of line ij, and is the given parameter of the MTDC power network.

The above system of equations is linear, there are n unknowns of buses' voltage offsets in it and only n-1 equations, therefore it is a system of linear indeterminate equations. In addition, the n unknowns of buses' voltage offsets cover all buses of the MTDC power network, which means all buses' voltages are treated equally. Such equal treatment is indeed a kind of symmetry in theoretical physics. As a result, the above system of equations is referred to as the system of symmetric linear indeterminate equations of buses' injection active powers in terms of buses' voltage offsets.

In step S2, a symmetric linear matrix equation of buses' voltage offsets in terms of buses' injection active powers are established and each bus' voltage offset and bus' voltage of the MTDC power network are obtained according to the system of symmetric linear indeterminate equations of buses' injection active powers in terms of buses' voltage offsets.

The step S2 specifically comprises the following substeps of:

according to the system of symmetric linear indeterminate equations of buses' injection active powers in terms of buses' voltage offsets, establishing a symmetric linear matrix equation of buses' voltage offsets in terms of buses' injection active powers as follows:

$$\begin{bmatrix} v_1 \\ \vdots \\ v_j \\ \vdots \\ v_n \end{bmatrix} = (a_{ji}) \begin{bmatrix} P_1 \\ \vdots \\ P_i \\ \vdots \\ P_{n-1} \end{bmatrix}, (a_{ji}) = (G_{ij})^+$$

where i is the serial number of an arbitrary bus in the MTDC power network, i is natural number and equal to 1, 2 •••, n, n is the total number of buses excluding neutral point in the MTDC power network, and n is a natural number; j is the serial number of an arbitrary bus in the MTDC power network, j is natural number and equal to 1, 2 •••, n; $P_i$ is the bus' injection active power at bus i (the active power injected by the power source or load on bus i); $v_j$ is the bus' voltage offset at bus j, and it is the difference between the bus' voltage and 1.0 per-unit voltage; $(a_{ji})$ is the Moore-Penrose pseudoinverse matrix of the bus conductance matrix $(G_{ij})$ of the MTDC power network, "+" is the operator of the Moore-Penrose pseudoinverse;

the above matrix equation is established based on the system of symmetric linear indeterminate equations of buses' injection active powers in terms of buses' voltage offsets, and the method for obtaining its Moore-Penrose pseudoinverse matrix $(a_{ji})$ needs some algebraic symmetry conditions, therefore the above matrix equation is referred to as the symmetric linear matrix equation of buses' voltage offsets in terms of buses' injection active powers; and according to the symmetric linear matrix equation of buses' voltage offsets in terms of buses' injection active powers and the given buses' injection active powers, calculating each bus' voltage offset of the MTDC power network and calculating each bus' voltage by adding this bus' voltage offset to 1.0 per-unit.

Because the symmetric linear matrix equation of buses' voltage offsets in terms of buses' injection active powers takes the buses' injection active powers (rather than their increments) as variables, the accuracy of the obtained distribution of buses' voltages of the MTDC power networks is near perfect and not influenced by wide variances of buses' injection active powers; in addition, the distribution of buses' voltages is obtained by merely one-step simple linear calculation, thus the method of the present invention is fast and reliable.

In step S3, establishing a symmetric linear relationship that expresses a line-transferred linear active power flow in terms of buses' injection active powers is established and each line-transferred linear active power flow of the MTDC power network is obtained according to the symmetric linear matrix equation of buses' voltage offsets in terms of buses' injection active powers, known line-transferred non-linear active power flow and inherent operation features of the MTDC power network.

The step S3 specifically comprises the following substeps of:

according to the known line-transferred non-linear active power flow and inherent operation features of the MTDC power network, establishing a linear relationship that expresses a line-transferred linear active power flow in terms of buses' voltage offsets as follows:

$$P_{ij} = \frac{v_i - v_j}{R_{ij}}$$

as shown in FIG. 2, i is the serial number of an arbitrary bus in the MTDC power network, i is natural number and equal to 1, 2 •••, n, n is the total number of buses excluding neutral point in the MTDC power network, and n is a natural number; j is the serial number of an arbitrary bus in the MTDC power network, j is natural number and equal to 1, 2 •••, n; ij denotes the line between bus i and bus j; $P_{ij}$ is the line-transferred linear active power flow of line ij; $v_i$ and $v_j$ are the buses' voltage offsets at bus i and bus j, respectively, and they are the differences between bus' voltage and 1.0 per-unit voltage; $R_{ij}$ is the resistance of line ij; n and $R_{ij}$ are given parameters of the MTDC power network;

according to the linear relationship that expresses a line-transferred linear active power flow in terms of buses' voltage offsets and the symmetric linear matrix equation of buses' voltage offsets in terms of buses' injection active powers, establishing a symmetric linear relationship that expresses a line-transferred linear active power flow in terms of buses' injection active powers as follows:

$$P_{ij} = \frac{1}{R_{ij}} \sum_{k=1}^{N} (a_{ik} - a_{jk}) P_k$$

where k is the serial number of an arbitrary bus in the MTDC power network, k is natural number and equal to 1, 2 •••, n; $a_{ik}$ and $a_{jk}$ are respectively the elements in row i and column k and in row j and column k of the Moore-Penrose pseudoinverse matrix of the bus conductance matrix of the MTDC power network; $P_k$ is the bus' injection active power at bus k and is the given parameter of the MTDC power network;

the symmetric linear relationship that expresses a line-transferred linear active power flow in terms of buses' injection active powers is established based on the symmetric linear matrix equation of buses' voltage offsets in terms of buses' injection active powers, therefore $P_{ij}$ is referred to as the line-transferred symmetric linear active power flow of line ij; and according to the symmetric linear relationship that expresses a line-transferred linear active power flow in terms of buses' injection active powers and the given buses' injection active powers, calculating each line-transferred linear active power flow of the MTDC power network, such that the distribution of line-transferred linear active power flows of all lines in the MTDC power network is obtained; the accuracy of the distribution is near perfect and not influenced by wide variances of buses' injection active powers; in addition, the distribution of line-transferred linear active power flows is achieved by merely one-step simple linear calculation, thus the method of the present invention is fast and reliable.

In the embodiment of the present invention, the method comprises the steps of: firstly establishing a system of symmetric linear indeterminate equations of buses' injection active powers in terms of buses' voltage offsets; then establishing a symmetric linear matrix equation of buses' voltage offsets in terms of buses' injection active powers and obtaining each bus' voltage offset and bus' voltage of the MTDC power network according to the system of symmetric linear indeterminate equations; finally establishing a symmetric linear relationship that expresses a line-transferred linear active power flow in terms of buses' injection active powers and obtaining each line-transferred linear active power flow of the MTDC power network according to the symmetric linear matrix equation of buses' voltage offsets in terms of buses' injection active powers, known line-transferred non-linear active power flow and inherent operation features of the MTDC power network. The method of the present invention reliably produces accurate results, and not only fast enough for real-time operation regulation of arbitrarily completed MTDC power networks but also applicable for widely varying operation states of them, thereby solving the problem that the existing methods for obtaining line-transferred active power flows in MTDC power networks are not only time-consumed and unreliable, but also not fast enough for real-time operation regulation of arbitrarily completed MTDC power networks and not applicable for widely varying operation states of them.

The foregoing descriptions are merely exemplary embodiment of the present invention, but are not intended to limit the present invention to it. Any modification, equivalent replacement, or improvement made without departing from the spirit and principle of the present invention shall fall within the protection scope of the present invention.

What is claimed is:

1. A symmetric method for obtaining line-transferred linear active power flows in Multi-Terminal Direct Current (MTDC) power networks, which comprises the following steps of:

establishing a system of symmetric linear indeterminate equations of buses' injection active powers in terms of buses' voltage offsets (a bus' voltage offset is the difference between the bus' voltage and 1.0 per-unit voltage) according to given lines' parameters, inherent operation features and given buses' injection active powers of the MTDC power network;

establishing a symmetric linear matrix equation of buses' voltage offsets in terms of buses' injection active powers and obtaining each bus' voltage offset and bus' voltage of the MTDC power network according to the system of symmetric linear indeterminate equations of buses' injection active powers in terms of buses' voltage offsets;

establishing a symmetric linear relationship that expresses a line-transferred linear active power flow in terms of buses' injection active powers and obtaining each line-transferred linear active power flow of the MTDC power network according to the symmetric linear matrix equation of buses' voltage offsets in terms of buses' injection active powers, known line-transferred non-linear active power flow and inherent operation features of the MTDC power network.

2. The symmetric method for obtaining line-transferred linear active power flows in MTDC power networks according to claim 1, wherein the step of establishing a system of symmetric linear indeterminate equations of buses' injection active powers in terms of buses' voltage offsets according to given lines' parameters, inherent operation features and given buses' injection active powers of the MTDC power network comprises the following sub-steps of:

according to given lines' parameters, inherent operation features and given buses' injection active powers of the MTDC power network, establishing a linear relationship that expresses a bus' injection active power in terms of buses' voltage offsets as follows:

$$P_i = \sum_{k=1, k \neq i}^{n} \frac{(v_i - v_k)}{R_{ik}}$$

where i is the serial number of an arbitrary bus in the MTDC power network, i is natural number and equal to 1, 2 ···, n, n is the total number of buses excluding neutral point in the MTDC power network, and n is a natural number; k is the serial number of an arbitrary bus in the MTDC power network, k is natural number and equal to 1, 2 ···, n; $P_i$ is the bus' injection active power at bus i; $v_i$ and $v_k$ are the buses' voltage offsets at bus i and bus k, respectively, and they are the differences between bus' voltage and 1.0 per-unit voltage; ik denotes the line between bus i and bus k and is called line ik for short; $R_{ik}$ is the resistance of line ik; $P_i$, n and $R_{ik}$ are given parameters of the MTDC power network;

according to the linear relationship that expresses a bus' injection active power in terms of buses' voltage offsets, establishing a system of symmetric linear indeterminate equations of buses' injection active powers in terms of buses' voltage offsets as follows:

$$\begin{bmatrix} P_1 \\ \vdots \\ P_i \\ \vdots \\ P_{n-1} \end{bmatrix} = (G_{ij}) \begin{bmatrix} v_1 \\ \vdots \\ v_j \\ \vdots \\ v_n \end{bmatrix}, G_{ij} = \begin{cases} \dfrac{-1}{R_{ij}}, & \text{for } j \neq i \\ \sum_{k=1, k \neq i}^{n} \dfrac{1}{R_{ik}}, & \text{for } j = i \end{cases}$$

where $P_1$ and $P_{n-1}$ are the buses' injection active powers at bus 1 and bus n-1, respectively, and are given parameters of the MTDC power network; j is the serial number of an arbitrary bus in the MTDC power network, j is natural number and equal to 1, 2 ···, n; ij denotes the line between bus i and bus j; $(G_{ij})$ is (n-1)-by-n bus conductance matrix of the MTDC power network, and is given matrix of the MTDC power network; $G_{ij}$ is the element in row i and column j of the bus conductance matrix $(G_{ij})$; $v_1$, $v_j$ and $v_n$ are buses' voltage offsets at bus 1, bus j and bus n, respectively, and they are the differences between bus' voltage and 1.0 per-unit voltage; $R_{ij}$ is the resistance of line ij, and is the given parameter of the MTDC power network.

3. The symmetric method for obtaining line-transferred linear active power flows in MTDC power networks according to claim 1, wherein the step of establishing a symmetric linear matrix equation of buses' voltage offsets in teems of buses' injection active powers and obtaining each bus' voltage offset and bus' voltage of the MTDC power network according to the system of symmetric linear indeterminate equations of buses' injection active powers in terms of buses' voltage offsets comprises the following sub-steps of:

according to the system of symmetric linear indeterminate equations of buses' injection active powers in terms of buses' voltage offsets, establishing a symmetric linear matrix equation of buses' voltage offsets in terms of buses' injection active powers as follows:

$$\begin{bmatrix} v_1 \\ \vdots \\ v_j \\ \vdots \\ v_n \end{bmatrix} = (a_{ji}) \begin{bmatrix} P_1 \\ \vdots \\ P_i \\ \vdots \\ P_{n-1} \end{bmatrix}, (a_{ji}) = (G_{ij})^+$$

where i is the serial number of an arbitrary bus in the MTDC power network, i is natural number and equal to 1, 2 •••, n, n is the total number of buses excluding neutral point in the MTDC power network, and n is a natural number; j is the serial number of an arbitrary bus in the MTDC power network, j is natural number and equal to 1, 2 •••, n; $P_i$ is the bus' injection active power at bus i; $v_j$ is the bus' voltage offset at bus j, and it is the difference between the bus' voltage and 1.0 per-unit voltage; $(a_{ji})$ is the Moore-Penrose pseudoinverse matrix of the bus conductance matrix $(G_{ij})$ of the MTDC power network, "+" is the operator of the Moore-Penrose pseudoinverse;

according to the symmetric linear matrix equation of buses' voltage offsets in terms of buses' injection active powers and the given buses' injection active powers, calculating each bus' voltage offset of the MTDC power network and calculating each bus' voltage by adding this bus' voltage offset to 1.0 per-unit.

4. The symmetric method for obtaining line-transferred linear active power flows in MTDC power networks according to claim 1, wherein the step of establishing a symmetric linear relationship that expresses a line-transferred linear active power flow in terms of buses' injection active powers and obtaining each line-transferred linear active power flow of the MTDC power network according to the symmetric linear matrix equation of buses' voltage offsets in terms of buses' injection active powers, known line-transferred non-linear active power flow and is inherent operation features of the MTDC power network comprises the following sub-steps of:

according to the known line-transferred non-linear active power flow and inherent operation features of the MTDC power network, establishing a linear relationship that expresses a line-transferred linear active power flow in terms of buses' voltage offsets as follows:

$$P_{ij} = \frac{v_i - v_j}{R_{ij}}$$

where i is the serial number of an arbitrary bus in the MTDC power network, i is natural number and equal to 1, 2 •••, n, n is the total number of buses excluding neutral point in the MTDC power network, and n is a natural number; j is the serial number of an arbitrary bus in the MTDC power network, j is natural number and equal to 1, 2 •••, n; ij denotes the line between bus i and bus j; $P_{ij}$ is the line-transferred linear active power flow of line ij; $v_i$ and $v_j$ are the buses' voltage offsets at bus i and bus j, respectively, and they are the differences between bus' voltage and 1.0 per-unit voltage; $R_{ij}$ is the resistance of line ij; n and $R_{ij}$ are given parameters of the MTDC power network;

according to the linear relationship that expresses a line-transferred linear active power flow in terms of buses' voltage offsets and the symmetric linear matrix equation of buses' voltage offsets in terms of buses' injection active powers, establishing a symmetric linear relationship that expresses a line-transferred linear active power flow in terms of buses' injection active powers as follows:

$$P_{ij} = \frac{1}{R_{ij}} \sum_{k=1}^{N} (a_{ik} - a_{jk}) P_k$$

where k is the serial number of an arbitrary bus in the MTDC power network, k is natural number and equal to 1, 2 •••, n; $a_{ik}$ and $a_{jk}$ are respectively the elements in row i and column k and in row j and column k of the Moore-Penrose pseudoinverse matrix of the bus conductance matrix of the MTDC power network; $P_k$ is the bus' injection active power at bus k and is the given parameter of the MTDC power network;

according to the symmetric linear relationship that expresses a line-transferred linear active power flow in terms of buses' injection active powers and the given buses' injection active powers, calculating each line-transferred linear active power flow of the MTDC power network.

* * * * *